United States Patent [19] [11] 4,292,601
Aldag et al. [45] Sep. 29, 1981

[54] FLASHLAMP EXCITED FLUID LASER AMPLIFIER

[75] Inventors: Henry R. Aldag, Boston, Mass.; John B. Marling, Pleasanton, Calif.; Charles T. Pike, Lexington, Mass.

[73] Assignee: Jersey Nuclear-Avco Isotopes, Inc., Bellevue, Wash.

[21] Appl. No.: 894,416

[22] Filed: Apr. 7, 1978

Related U.S. Application Data

[63] Continuation of Ser. No. 810,952, Jun. 29, 1977, abandoned.

[51] Int. Cl.² ............................................. H01S 3/093
[52] U.S. Cl. .......................... 331/94.5 L; 331/94.5 D; 331/94.5 P
[58] Field of Search .................... 331/94.5 P, 94.5 PE, 331/94.5 G, 94.5 L, 94.5 D

[56] References Cited

U.S. PATENT DOCUMENTS 3,740,665 6/1973 Itzkan ............................ 331/94.5 L
3,967,212 6/1976 Dere et al. ..................... 331/94.5 P

OTHER PUBLICATIONS

Boiteux et al., Applied Optics, vol. 9, No. 2 (Feb. 1970), pp. 514–515.
Jethwa et al., Applied Physics, vol. 4, No. 4 (Sep. 1974), pp. 299–302.

Primary Examiner—William L. Sikes
Attorney, Agent, or Firm—Weingarten, Maxham & Schurgin

[57] ABSTRACT

A flashlamp excited dye laser capable of high amplification and high pulse repetition rate. An active region of laser amplification is defined in a flowing dye by a long narrow channel created between confronting tube-shaped chambers. Laser excitation is directed into the channel through the transmissive walls of the chambers from flashlamps contained in each of the chambers, but which are thermally isolated from the dye channel. A specific geometry of the chambers provides a structural rigidity for long amplification channels.

14 Claims, 4 Drawing Figures

FLASHLAMP EXCITED FLUID LASER AMPLIFIER

This is a continuation, of application Ser. No. 810,952, filed June 29, 1977 and now abandoned.

FIELD OF THE INVENTION

The present invention relates to laser amplifiers and in particular to chambers for containing and exciting an amplifying medium.

BACKGROUND OF THE INVENTION

In laser applications, such as laser enrichment as described in U.S. Pat. No. 3,772,519, efficient laser utilization requires high intensity pulse outputs at high pulse repetition rates. The desire for higher pulse repetition rates at high intensities in a laser amplifier creates not only a need for efficient heat extraction but also the need for a rapid flow of the lasing medium through the amplifying channel.

The intensity of laser radiation in such applications is a function of the amplification or gain in the laser generation equipment which is in turn a function of the length of the active laser amplifying medium in the path of laser radiation. Particularly where precise frequency control is desired as in laser enrichment, the preferred form of laser amplifier has a long active medium wherein the gain is achieved by the length of the path on a single radiation pass, rather than by multiple reflection through the amplifying medium. It is accordingly desired to provide a long amplification channel of active medium without distortion or sag in the channel resulting from the length of the elements defining the channel.

BRIEF SUMMARY OF THE INVENTION

In a preferred embodiment for the present invention, apparatus is provided for laser amplification at high gain and intensity levels with a very high laser pulse repetition rate. In the laser amplifier apparatus of the invention a pair of elongate chambers are disposed in parallel to establish between confronting surfaces of the chambers a long narrow channel for the flow of the active lasing medium. Liquid cooled flashlamps are provided within each chamber to provide excitation through the chambers to the active medium flowing between the confronting faces of the chambers in the narrow channel. The placement of the flashlamps within the chambers permits their thermal isolation from the flowing medium while at the same time allowing efficient excitation of the medium.

A preferably cylindrical glass construction of the chambers permits great lengths of the amplifying channel to be realized without substantial distortion along a substantially straight optical path. Furthermore, construction of right circular cylindrical chambers is particularly simple and inexpensive. Additionally, the lasing medium is conveniently passed transversely through the lasing channel at a high flow velocity to enable extremely high pulse repetition rates.

BRIEF DESCRIPTION OF THE DRAWINGS

These and other features of the present invention are more fully described below in the detailed description of the preferred embodiment, presented for purposes of illustration and not by way of limitation, and in the accompanying drawing of which.

DETAILED DESCRIPTION OF THE PREFERRED EMBODIMENT

The present invention contemplates a laser amplifier geometry of extended channel length for high amplification and high pulse rate operation without excessive heat transfer to the lasing medium. It is to be understood that the principles of the instant invention are applicable to geometries other than shown in the preferred embodiment set forth below.

While the laser amplifier illustrated in the preferred embodiment is adapted to receive and amplify existing laser radiation, it is to be understood that the apparatus may also be used as an oscillator or tuned amplifier through the inclusion of reflectors to form an optical cavity.

Figure 1:
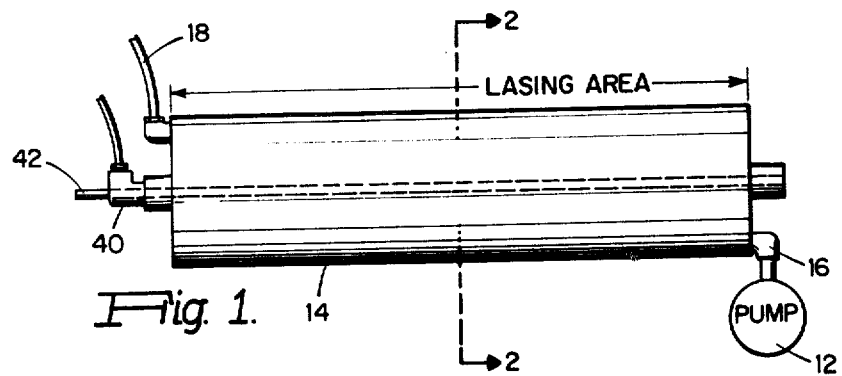
FIG. 1 is a side view of a laser amplifier according to the present invention.

A side elevation of the preferred laser amplifier is illustrated by FIG. 1. A generally cylindrical jacket or container 14 made of stainless steel or the like contains an active lasing medium supplied to it by a pump 12 through an input conduit 16 and expelled through an output conduit 18. The length of the apparatus is typically chosen for a predetermined gain to achieve a desired output level. Because of the extrusion like nature of the amplifier structure described below, substantial lengths can be realized without deformation detrimental to laser performance. Eighteen inches is a typical length for use in the present application to laser enrichment.

Figure 2:
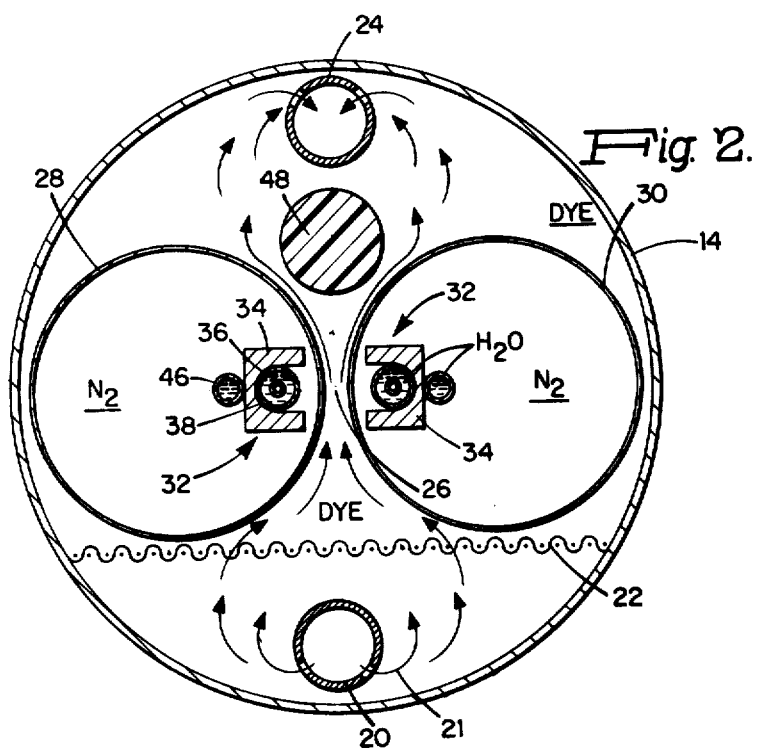
FIG. 2 is an interior sectional view of the laser amplifier of FIG. 1 along the section line indicated there.

An internal sectional view of the amplifier shown in FIG. 1 is presented in FIG. 2. The active medium typically a dye such as Rhodamine 6G in an appropriate transport fluid is supplied from the conduit 16 to an inlet manifold tube 20. The inlet manifold tube 20 has apertures 21 directing the input dye stream away from the amplifier region to minimize flow turbulence in that critical region of the dye flow path. A screen 22 is located in the dye flow path in order to reduce turbulence as the dye flows through to the active region. An exhaust manifold tube 24 of design similar to the input manifold tube 20 is arranged for receiving the dye solution after passing through the active lasing region. The active lasing region 26 of the amplifier is defined between two chambers, defined by cylindrical tubes 28 and 30, which are arranged parallel to one another within the container 14. The active lasing region 26 is defined as a location or a region of minimum separation approximately three millimeters in width between the parallel confronting outer surfaces of the cylindrical tubes 28 and 30. The separation between the outer walls of the tubes 28 and 30 and the inner wall of the container 14 is made minimal to force virtually all of the dye fluid through the region 26.

The tubes 28 and 30 are typically right circular cylindrical glass tubes formed of heat treated durable material such as PYREX, manufactured by Corning Glass Works of Corning, N.Y. PYREX glass has the desirable characteristic of an optical filter for screening undesirable ultraviolet radiation (to reduce unwanted energization of the fluid) and is of generally low thermal expansion. The right circular cylindrical configuration is convenient because it enables the use of many easily constructed parts. It should be understood that other materials having similar optical and physical features may be used.

The tubes 28 and 30 which each define a chamber are preferably filled with an inert dry gas, such as nitrogen, in order to prevent condensation and contamination of the inner optically transmissive surfaces thereof.

Within each of the two chambers there is a flashlamp assembly 32 located close to the active lasing region 26. The flashlamp assembly 32 is operated to provide inversion energy to the active medium within the active lasing region 26. The flashlamp assembly 32 is more clearly shown in FIG. 4 to include a long U-shaped channel element 34 having the curved inner surface coated with a chalk-like substance to provide a diffuse reflector 36. Suitable reflective substances are magnesium oxide or barium sulfate. The diffuse reflector 36 provides nonspecular reflection of flashlamp radiation into the active lasing region 26. The use of such a diffuse reflector 36 simplifies design and construction and permits placement of the flashlamp assembly 32 as close as physically possible to the active region 26 where maximum efficiency can be attained.

Figure 3:
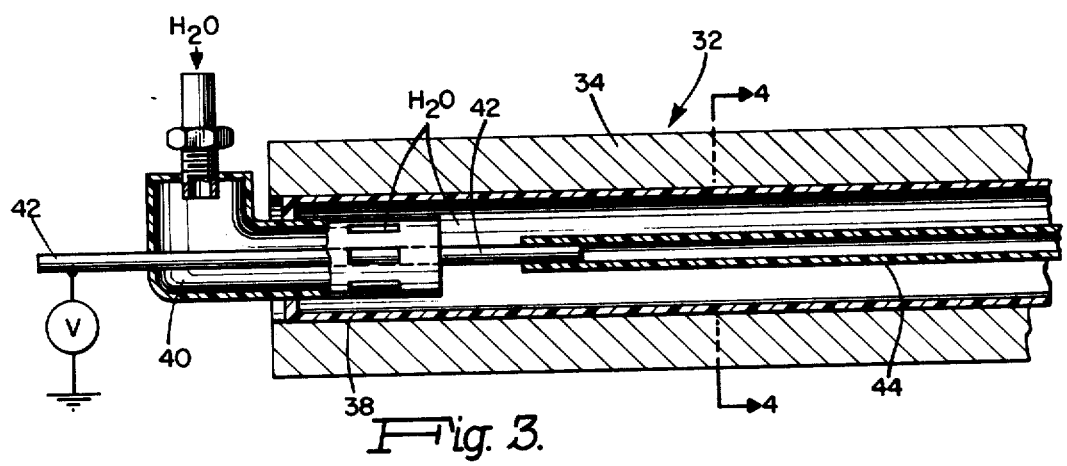
FIG. 3 is a longitudinal sectional view of a flashlamp tube and cooling conduit for use in the laser amplifier of FIG. 2.

Included in the flashlamp assembly 32 is a cooling jacket 38 fitted within the channel element 34 and supplied with cooling water from a manifold 40 as shown in FIG. 3. The manifold 40 is preferably electrically non-conductive. A flashlamp 44 is disposed within the cooling jacket 38 so as to be completely surrounded by cooling water. The manifold 40 has a conductive rod 42 extending through it to make electrical connection with the flashlamp 44. A similar manifold and conductive rod (not shown) are provided at the opposite end of the flashlamp 44. The flashlamp 44 contains a gas suitable to sustain an arc discharge for optical excitation of the dye solution.

The transmissive material for flashlamp 44 and the cooling jacket 38 are preferably a synthetic quartz such as SUPRASIL, manufactured by Amersil, Inc. of Hillside, N.J. or SPECTROSIL, manufactured by Thermal American Fused Quartz Company of Mountville, N.J. These materials are particularly suitable because they are optically transmissive in the far ultraviolet and are not subject to loss of transmissivity through solarization. There is thus minimum containment of flashlamp heat.

Figure 4:
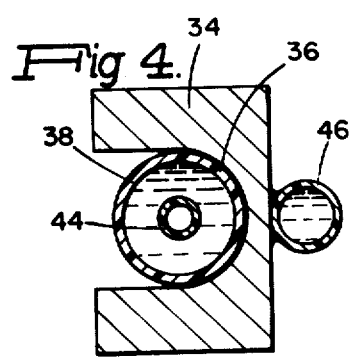
FIG. 4 is a cross-sectional view of a flashlamp assembly having the flashlamp and cooling conduit of FIG. 3.

Because the flashlamp assembly 32 is subject to intense heating, additional cooling elements are provided. In FIG. 4, a cooling conduit 46 is shown in thermal contact with the channel element 34. Typically, water from one of the manifolds 40 is applied to the conduit 46 at one end and exhausted from the flashlamp assembly 32 at the opposite end. Water is the preferred coolant for assembly 32 since it has the advantage of both high specific heat and good optical transmissivity.

The cooling arrangement for the flashlamp 44 is a distinct advantage in that it permits both thermal and physical separation of the flashlamp assembly 32 from the active lasing region 26. Control of the thermal conditions in the active lasing region 26 is important in order to maintain optical beam quality and to limit beam divergence.

To further control the flow of fluid through the apparatus, a flow diverter 48 is located downstream from the region 26. The flow diverter 48 provides a more constant cross-sectional area in the region immediately downstream of the lasing region 30. This limits fluid flow separation which would otherwise occur in a diverging flow channel and cause disturbances in the flow through the region 26 detrimental to laser performance.

The cylindrical tubes 28 and 30 are conveniently sealed to the ends of container 14 through O-ring elements (not shown) providing a fluid-tight interior to container 14. Similar or other convenient seals may be employed between tubes 28 and 30 and the conduits 38 and 46 through a suitable support structure (not shown).

The extrusion like shape of the amplifier in the preferred embodiment is an advantage in that it permits the construction of very long and correspondingly high powered laser amplifiers without structural difficulty in maintaining shape. A cylindrical shape is particularly advantageous for simplicity of design. Laser amplifiers according to the present invention have been built for very high pulse rate applications having pulse powers in excess of one-half joule.

The apparatus according to the invention described herein is suitable for application in isotope processing and production plants as discussed in the aforementioned U.S. Pat. No. 3,772,519 incorporated herein by reference. It should be understood that the present invention is not limited to the disclosed application or specific apparatus and is to be defined in scope only as indicated in the appended claims.

What is claimed is:

1. Apparatus for exciting a fluid laser medium comprising:
    first and second confronting walls disposed parallel to each other to define a fluid channel for the flow of the fluid laser medium between said confronting walls;
    said confronting walls including optically transmissive portions along the length of said fluid channel transverse to the fluid flow;
    means adjacent the optically transmissive portions of said confronting walls for applying optical excitation to said fluid channel from a location behind said confronting walls;
    means associated with said excitation applying means for providing cooling thereof;
    the laser medium being forced through said fluid channel; and
    means including a gas filled region between said excitation applying means and said fluid channel for providing thermal isolation between said excitation applying means and said fluid channel whereby heat transfer between said excitation means and said fluid channel is reduced.

2. Apparatus for exciting a fluid laser medium according to claim 1 wherein said means for providing cooling includes an optically transmissive cooling conduit surrounding said excitation means.

3. Apparatus for exciting a laser medium according to claim 1 wherein said optical excitation applying means comprises:
    a cylindrical flashlamp; and
    a reflective surface partially surrounding said flashlamp and disposed to direct radiation from said flashlamp into said fluid channel.

4. Apparatus for exciting a laser medium according to claim 1 further comprising means for reducing turbulence in the laser medium forced through said fluid channel.

5. Apparatus for exciting a fluid laser medium comprising:

first and second cylindrical tubes disposed parallel to one another;

a fluid channel being defined between confronting walls of said cylindrical tubes along the substantial length of said cylindrical tubes;

the confronting walls of said cylindrical tubes along said fluid channel being optically transmissive;

means within at least one of said cylindrical tubes for applying optical excitation to said fluid channel; and means for forcing the laser medium through said fluid channel.

6. Apparatus for exciting the laser medium according to claim 5 wherein said cylindrical tubes contain a dry gas.

7. Apparatus for exciting a laser medium according to claim 5 further comprising:

a tubular container having fluid inlet means and outlet means and enclosing said first and second cylindrical tubes;

a tubular inlet manifold within said tubular container communicating with said inlet means and having apertures therein facing away from said fluid channel for introducing the laser medium to said fluid channel; and a tubular outlet manifold within said tubular container communicating with said outlet means and having apertures therein facing away from said fluid channel for receiving the laser medium from said inlet manifold through said fluid channel.

8. Apparatus for exciting a laser medium according to claim 7 further comprising:

means for maintaining a pressure head in the flow of the laser medium downstream of said fluid channel; and a screen interposed upstream of the fluid channel to impede turbulence in the laser medium.

9. A laser amplifier for exciting a fluid laser medium comprising:

a generally cylindrical container having a fluid inlet manifold and a fluid outlet manifold;

first and second straight cylindrical tubes within said cylindrical container;

said first and second cylindrical tubes being disposed parallel to each other to define a channel for the flow of the fluid laser medium between exterior confronting surfaces thereof;

said first and second cylindrical tubes containing a dry gas;

portions of said first and second cylindrical tubes in the region of the confronting surfaces being non-transmissive of a predetermined optical spectrum to avoid undesired medium energization;

first and second straight cylindrical flashlamps enclosed within said first and second cylindrical tubes respectively and placed proximate to said flow channel;

said first and second flashlamps having an arc discharge enclosed within them and being generally transparent to the radiation generated in the discharge;

first and second cooling jackets enclosing said first and second flashlamps respectively, said first and second cooling jackets being formed of a generally transparent material;

first and second reflectors partially surrounding said first and second flashlamps and cooling jackets to direct the radiation from said first and second flashlamps through said channel;

conduit means in thermal contact with said first and second reflectors;

means for applying a cooling fluid to said conduit means for cooling said first and second reflectors;

means for communicating an optically transparent cooling fluid through said first and second cooling jackets and around said first and second flashlamps respectively;

a straight tubular inlet manifold within said cylindrical container having apertures therein facing away from said fluid channel for introducing the laser medium into said cylindrical container along the length of said fluid channel;

a straight tubular outlet manifold within said cylindrical container having slits therein facing away from said fluid channel for receiving the laser medium from said inlet manifold through said fluid channel;

a flow diverter disposed parallel to said fluid channel on the downstream side of said fluid channel for reducing turbulence in the flow of the laser medium; and a screen interposed between said inlet manifold and said fluid channel for impeding turbulence in the laser medium.

10. A laser amplifier for exciting a fluid laser medium comprising:

a container having a fluid inlet manifold and a fluid outlet manifold;

first and second extrusion like members within said cylindrical container;

said first and second extrusion like members being disposed parallel to each other to define a channel for the flow of the fluid laser medium between confronting surfaces thereof;

the portions of said first and second extrusion like members in the region of the confronting surfaces being transmissive of a predetermined optical spectrum only to avoid undesired medium energization;

first and second flashlamps placed proximate to said flow channel;

said first and second flashlamps having an arc discharge enclosed within them and being generally transparent to the radiation generated in the discharge;

first and second cooling jackets enclosing said first and second flashlamps respectively, said first and second cooling jackets being formed of a generally transparent material;

first and second channel shaped reflectors partially surrounding said first and second flashlamps and cooling jackets to direct the radiation from said first and second flashlamps through said fluid channel;

means for communicating an optically transparent cooling fluid through said first and second cooling jackets and around said first and second flashlamps respectively;

an inlet manifold within said container for introducing the laser medium into said container along the length of said fluid channel;

an outlet manifold within said container for receiving the laser medium from said inlet manifold through said fluid channel; and a flow impedance on the downstream side of said fluid channel for reducing turbulence in the flow of the laser medium.

11. Apparatus for exciting a fluid laser medium comprising:
- first and second confronting walls disposed parallel to each other to define a channel for the flow of the fluid laser medium between said confronting walls;
- said confronting walls including optically transmissive portions along the length of said fluid channel transverse to the fluid flow;
- means adjacent the optically transmissive portions of said confronting walls for applying optical excitation to said fluid channel in thermal isolation from said fluid channel; and
- the laser medium being forced through said fluid channel;
- said means for applying excitation in thermal isolation including a cooling conduit surrounding said excitation applying means and means for insulating said conduit from said fluid channel; and
- said transmissive wall portions are nontransmissive of a predetermined optical spectrum to avoid undesired fluid medium energization.

12. Apparatus for exciting a fluid laser medium comprising:
- first and second confronting walls disposed parallel to each other to define a channel for the flow of the fluid laser medium between said confronting walls;
- said confronting walls including optically transmissive portions along the length of said fluid channel transverse to the fluid flow;
- means adjacent the optically transmissive portions of said confronting walls for applying optical excitation to said fluid channel in thermal isolation from said fluid channel; and
- the laser medium being forced through said fluid channel; said optical excitation applying means further comprising:
- a cylindrical flashlamp; and
- a reflective surface partially surrounding said flashlamp and disposed to direct radiation from said flashlamp into said fluid channel; a transmissive jacket surrounding said flashlamp; and
- means for supplying fluid to the region between said transmissive jacket and said flashlamp to provide cooling of said flashlamp.

13. Apparatus for exciting a laser medium according to claim 12 further comprising:
- conduit means in thermal contact with said reflective surface; and
- means for applying a cooling fluid through said conduit means.

14. Apparatus for exciting a laser medium according to claim 12 wherein said conduit means communicates with said transmissive jacket for the flow of said cooling fluid.

* * * * *